(12) United States Patent
Heiner et al.

(10) Patent No.: US 8,701,197 B2
(45) Date of Patent: Apr. 15, 2014

(54) METHOD, APPARATUS AND COMPUTER PROGRAM PRODUCT FOR SECURE SOFTWARE INSTALLATION

(75) Inventors: Andreas Petrus Heiner, Espoo (FI); Nadarajah Asokan, Espoo (FI); Desmond Sebastiaan van der Meer, Espoo (FI)

(73) Assignee: Nokia Corporation, Espoo (FI)

( * ) Notice: Subject to any disclaimer, the term of this patent is extended or adjusted under 35 U.S.C. 154(b) by 963 days.

(21) Appl. No.: 11/961,088

(22) Filed: Dec. 20, 2007

(65) Prior Publication Data

US 2009/0165077 A1  Jun. 25, 2009

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(52) U.S. Cl.
USPC ......... 726/25; 726/1; 726/22; 726/23; 726/24

(58) Field of Classification Search
USPC .................. 713/201; 726/22–268, 1; 709/225
See application file for complete search history.

(56) References Cited

U.S. PATENT DOCUMENTS

| | | | | |
|---|---|---|---|---|
| 7,516,220 | B1 * | 4/2009 | Stiert ............................. | 709/225 |
| 2002/0138471 | A1 * | 9/2002 | Dutta et al. ....................... | 707/3 |
| 2005/0066201 | A1 * | 3/2005 | Goodman et al. ............ | 713/202 |
| 2005/0114705 | A1 * | 5/2005 | Reshef et al. ................. | 713/201 |
| 2006/0218642 | A1 | 9/2006 | Kuppusamy et al. | |
| 2006/0253584 | A1 * | 11/2006 | Dixon et al. .................. | 709/225 |
| 2007/0006302 | A1 * | 1/2007 | Donnelly et al. ................ | 726/22 |
| 2009/0113294 | A1 * | 4/2009 | Sanghavi et al. ............. | 715/269 |
| 2010/0031315 | A1 * | 2/2010 | Feng et al. ......................... | 726/3 |

OTHER PUBLICATIONS

Heath, *Symbian OS Platform Security: Software Development Using the Symbian OS Security Architecture*, 2006, all pages.
PCT Search Report and Written Opinion for Application No. PCT/IB2008/054717 dated Apr. 17, 2009.
Schneider, Walter, et al., "Controlled & Automatic Processing: Behavior, Theory, and Biological Mechanisms," *Cognitive Science* 27, (2003) pp. 525-559.
Poldrack, R.A., et al., "Interactive Memory Systems in the Human Brain," *Letters to Nature: Nature* 414, pp. 546-550, Nov. 29, 2001.
Neal, David T., et al., "Habits—A Repeat Performance," *Current Directions in Psychological Science*, 15 (4), 2002.
Java Security, http://java.sun.com/javase/technologies/security/index.jsp, 4 pages.
J2ME Security, Understanding MIDP 2.0's Security Architecture, http://developers.sun.com/mobility/midp/articles/permissions/, 11 pages.
Symbian OS Platform Security, http://www.symbian.com/developer/techlib/v9.1docs/doc_source/guide/N10022/index.html, 1 page.

* cited by examiner

*Primary Examiner* — Tae Kim
(74) *Attorney, Agent, or Firm* — Alston & Bird LLP

(57) ABSTRACT

A method, apparatus and computer program product are provided for secure software download or installation. In this regard, sensory notifications and cognitive activities are implemented prior to proceeding to a download or installation procedure. For example, a sensory notification can be provided if security attributes of software are noncompliant with security preferences. Additionally, performance of a task can be required if security attributes of software are noncompliant with the security preferences prior to installation of the software, wherein requiring performance of a task comprises selecting the task such that the task is variable from one installation of the software to another installation of the software.

23 Claims, 5 Drawing Sheets

METHOD, APPARATUS AND COMPUTER PROGRAM PRODUCT FOR SECURE SOFTWARE INSTALLATION

TECHNOLOGICAL FIELD

Embodiments of the present invention relate generally to software security, and more particularly, relate to a method, apparatus and computer program for secure software installation in consideration of sensory indications and cognitive processes.

BACKGROUND

Software security continues to be an increasingly important issue in today's interconnected society. More and more devices are downloading, installing, and utilizing software from both trusted and untrusted locations on the Internet. Each download and installation of software on a device poses a risk to the device or data stored on the device. Numerous solutions presently exist which attempt to protect users from the dangers of malicious software, but often, due in part to the actions of users, software that is generally known to be malicious continues to cause damage to devices and data.

A problem associated with conventional software security solutions is that the solutions can often cause users to fail to appreciate the dangers that can result from downloading and installing malicious software. This can result from the configuration of the user interface, or from the task flow implemented in conjunction with the user interface. Often conventional security solutions involve confusing and unclear inquiries of the user. Users may be overwhelmed by the inquiries or information presented to them with respect to security. In some instances, the differences between an inquiry of the user and a warning are not clear. As a result, in some cases users ignore valid security alerts simply to get past the security solution and download or install the software. If this behavior is continuously repeated, the repetitive nature of the required selections will cause the conventional software security solution to become completely transparent to the user. As such, it is often the case that malicious software is installed on a device with explicit user consent. Likewise, due to the configuration of conventional security solutions, a user may be hesitant to, or may not, download or install software that is known to be safe.

Adding to the confusion, often conventional security solutions involve different client-side applications for each step of the download and installation process. Such architecture can create redundancy in user inquiries, generating additional user confusion. For example, a browser application may be used to locate and select software. A different data transfer application may be used for the downloading of the software, and yet a different installation application may be used to install the software. Due to the segmented architecture of such a complete solution, additional and unnecessary user prompts may be generated at each step of the procedure which can add to a user's confusion and lack of appreciation for the security implications of downloading and installing software.

An exemplary conventional software security solution that may have the aforementioned issues is the software selection, download and installation (SDI) process on many cellular telephones. The SDI process contains a number of steps that may be considered confusing and unclear to some users. As a result, users may ignore valid security issues or refuse to install software from known reputable sources. Further, the SDI process may be considered to involve unnecessary and redundant steps which can contribute to some user's confusion and lack of appreciation for the process.

Thus, conventional software security solutions may either fail to effectively convey to a user the danger posed by malicious software or otherwise enable unsafe security behavior. Further, in some instances, conventional software security solutions leave users confused and unappreciative of the purpose of the solution. As such, a need exists for a software security solution that successfully notifies a user of unsafe software and forces the user to cognitively appreciate the decision to download and install potentially dangerous software to a device.

BRIEF SUMMARY

A method, apparatus and computer program product are therefore provided that allow for secure software download or installation using sensory notifications and requiring cognitive activities prior to proceeding to a download or installation procedure. In this regard, various embodiments of the invention determine security attributes of software prior to installation of the software. The security attributes can then be compared to predetermined security preferences. If the security attributes are noncompliant with the security preferences a notification can be provided. In some embodiments of the invention, the notification can be various sensory notifications. Further, if the security attributes are noncompliant with the security preferences, performance of a task prior to installation of the software can be required, wherein performance of a task can comprise selecting the task such that the task is variable from one installation of the software to another installation of the software.

In some embodiments of the invention, the task can be, for example, an action that may require conscious interaction from a user, such as, for example, solving a puzzle or responding to an inquiry. Further, in some embodiments of the invention, the security attribute values of selected software can determine the relative complexity of the task that is required to be performed.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 1 is a schematic block diagram of a mobile terminal according to an exemplary embodiment of the present invention;

FIG. 2 a schematic block diagram of a wireless communications system according to an exemplary embodiment of the present invention;

DETAILED DESCRIPTION

Figure 1:
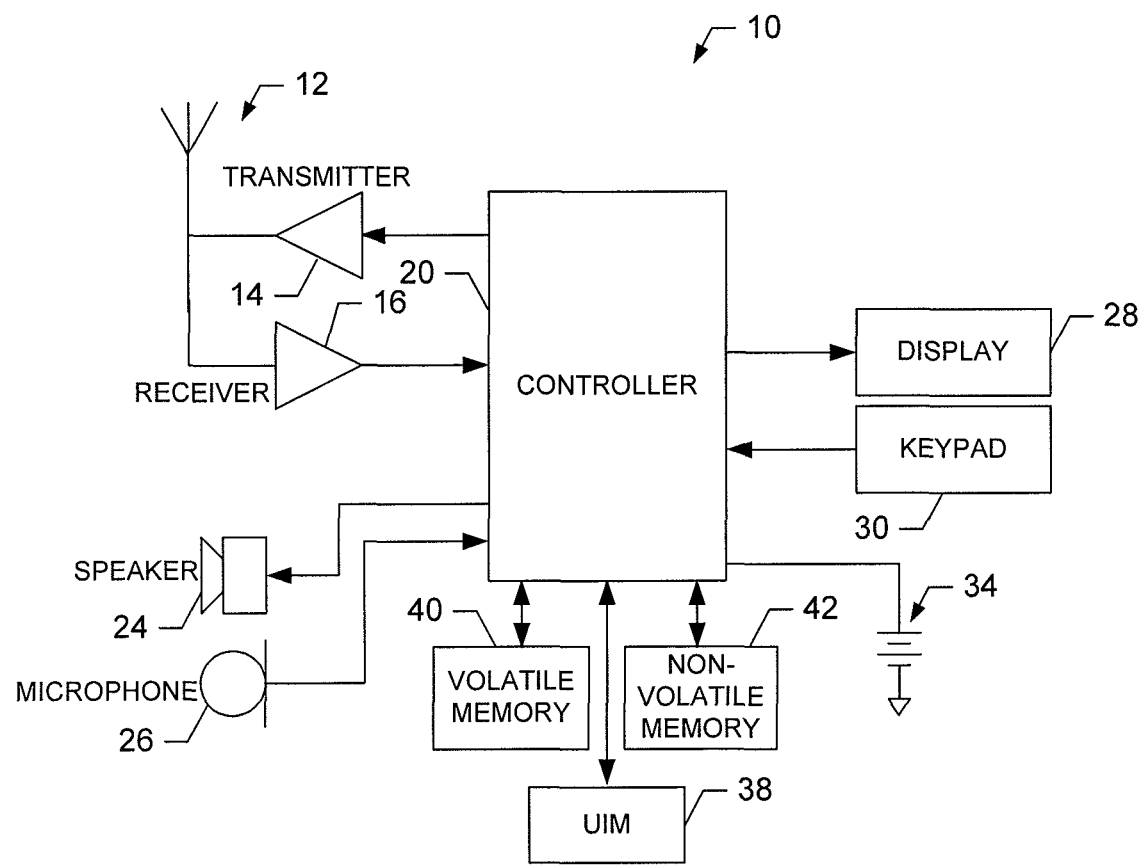

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 2:
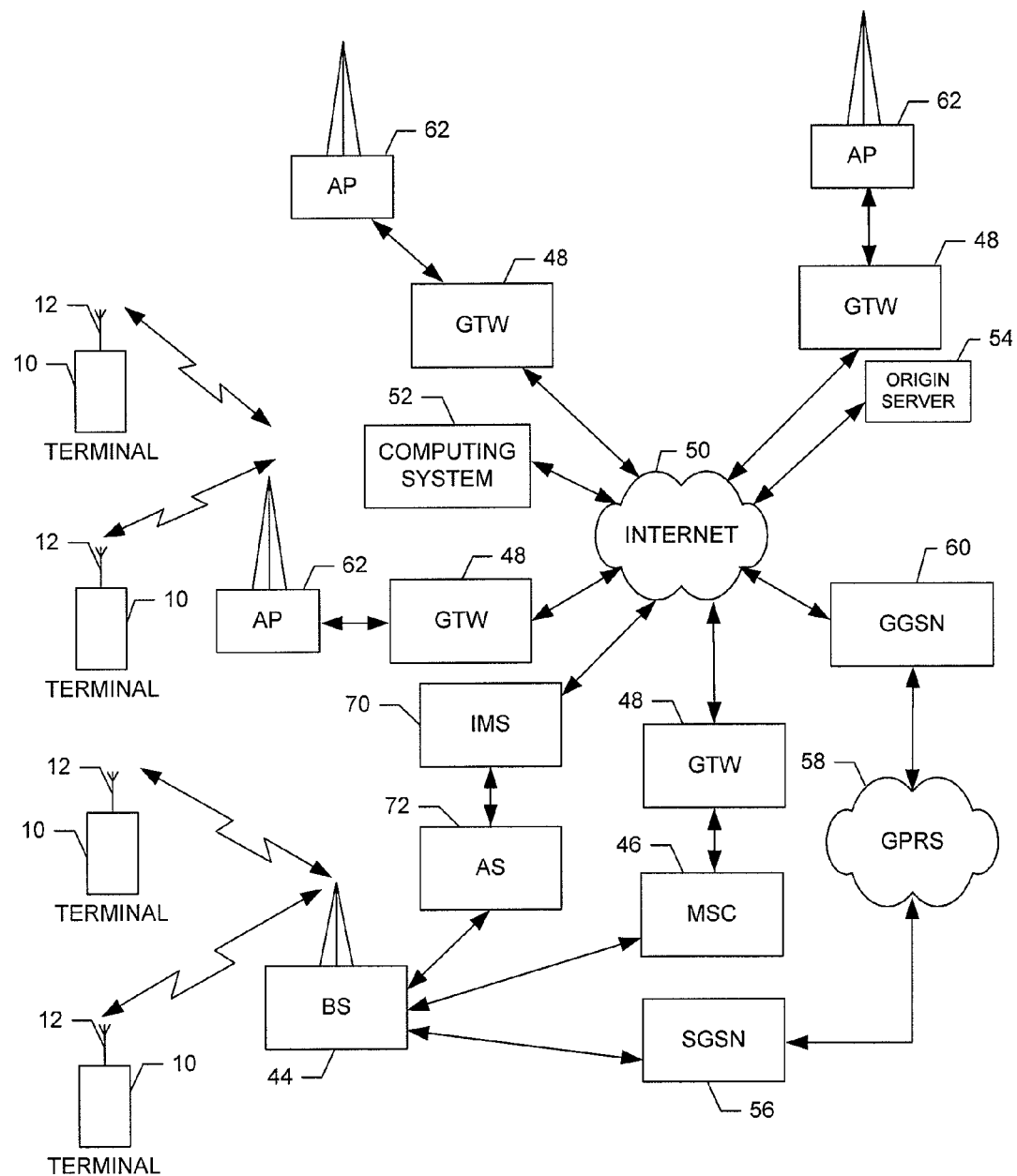

FIGS. 1 and 2 provide an exemplary mobile environment and mobile device on which an embodiment of the invention can be utilized. However, references to FIGS. 1 and 2 are used only for illustration purposes. It is contemplated that embodiments of the invention could be utilized in a variety of environments and on a variety of devices. Exemplary environments according to various embodiments of the invention can include, but are not limited to, the Internet, proprietary wired networks, proprietary wireless networks, local area networks, wireless local area networks, radio frequency networks, Bluetooth networks, infrared networks, satellite networks, or any of a number of different types of networks using various networking technologies. Exemplary devices according to various embodiments of the invention can include, but are not limited to, personal computers, mobile computing devices, Global Positioning System (GPS) devices, television and cable television tuning devices, household devices, such as appliances and security systems, or any other device with a network connection.

FIG. 1 illustrates a block diagram of a mobile terminal 10 that could benefit from embodiments of the present invention. It should be understood, however, that a mobile telephone as illustrated and hereinafter described is merely illustrative of one type of mobile terminal (also known as user equipment) that could benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennas) in operable communication with a transmitter 14 and a receiver 16. The mobile terminal 10 further includes an apparatus, such as a controller 20 or other processing element that provides signals to and receives signals from the transmitter 14 and receiver 16, respectively. The signals include signaling information in accordance with the air interface standard of the applicable cellular system, and also user speech, received data or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content or other web page content, according to a Wireless Application Protocol (WAP), Hypertext Transfer Protocol (HTTP) or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, or the like, as described below.

The BS 44 can also be coupled to Internet 50 through IMS 70 and, in some embodiments, AS 72. As known to those skilled in the art, IMS can be an internet protocol multimedia subsystem (IMS) which can provide a framework for delivering internet protocol multimedia to mobile terminals. IMS 70 can provide a link to Internet 50 in a packet switched domain. The link between BS 44 and Internet 50 through IMS 70 can also optionally include AS 72. AS 72 can be an application service (AS) which can provide functionality for managing communications sessions.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 or origin server 54 may be coupled to the mobile terminal 10 via the Internet 50, SGSN 56 and GGSN 60. In this regard, devices such as the computing system 52 or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to Session Initiation Protocol (SIP) or the Hypertext Transfer Protocol (HTTP) or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, or any of a number of other devices, to the Internet 50, the mobile terminals 10 can communicate with one another, the computing system, etc., to thereby carry out various functions of the mobile terminals 10, such as to transmit data, content or the like to, or receive content, data or the like from, the computing system 52. As used herein, the terms "data," "content," "information" and similar terms may be used interchangeably to refer to data capable of being transmitted, received or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, or any of a number of other devices, to the Internet 50, the mobile terminals 10 can communicate with one another, the computing system, 52, the origin server 54, etc., to thereby carry out various functions of the mobile terminals 10, such as to transmit data, content or the like to, or receive content, data or the like from, the computing system 52, or the origin server 54, etc.

Although not shown in FIG. 2, in addition to or in lieu of coupling the mobile terminal 10 to computing systems across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques or the like. One or more of the computing system 52, can additionally, or alternatively, include a removable memory capable of storing content, which can thereafter be transferred to the mobile terminal 10. Further, the mobile terminal 10 can be coupled to one or more electronic devices, such as printers, digital projectors or other multimedia capturing, producing or storing devices (e.g., other terminals).

Figure 3:
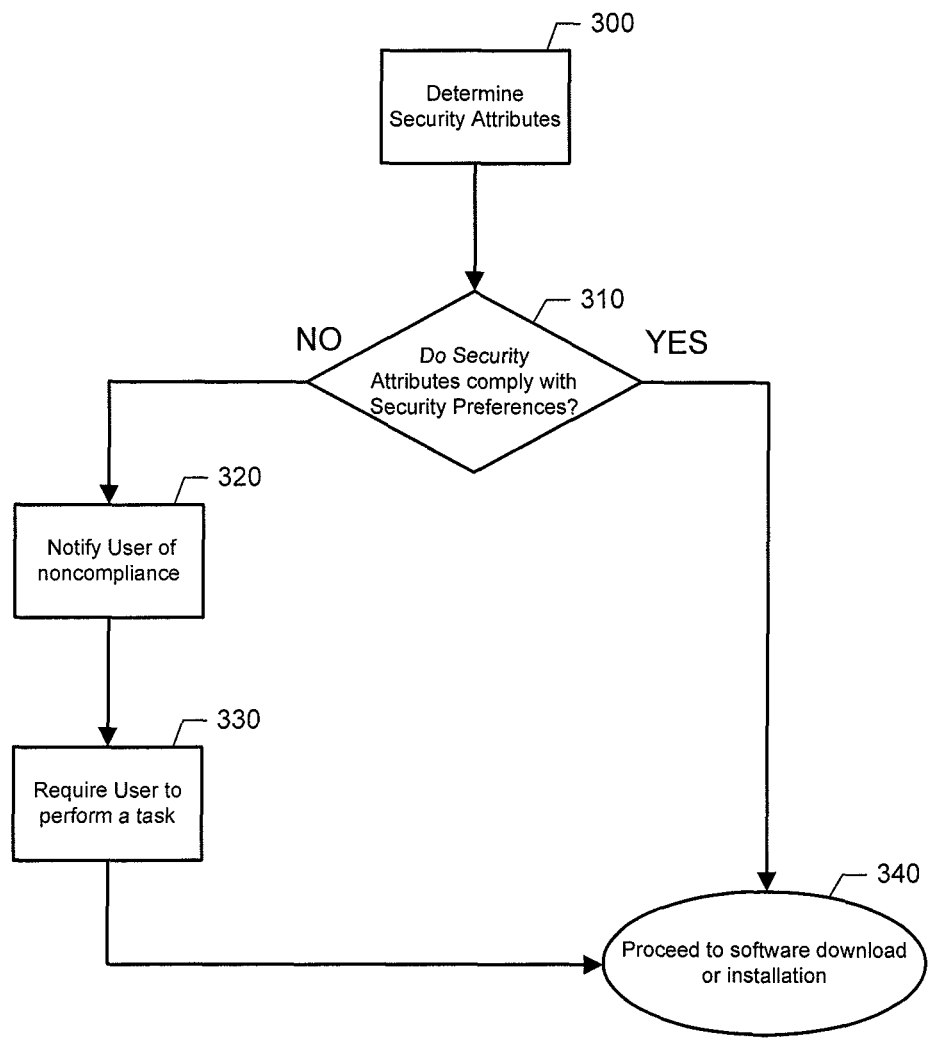
FIG. 3 is a flow chart of a secure download or installation procedure according to an exemplary embodiment of the present invention.
Figure 4:
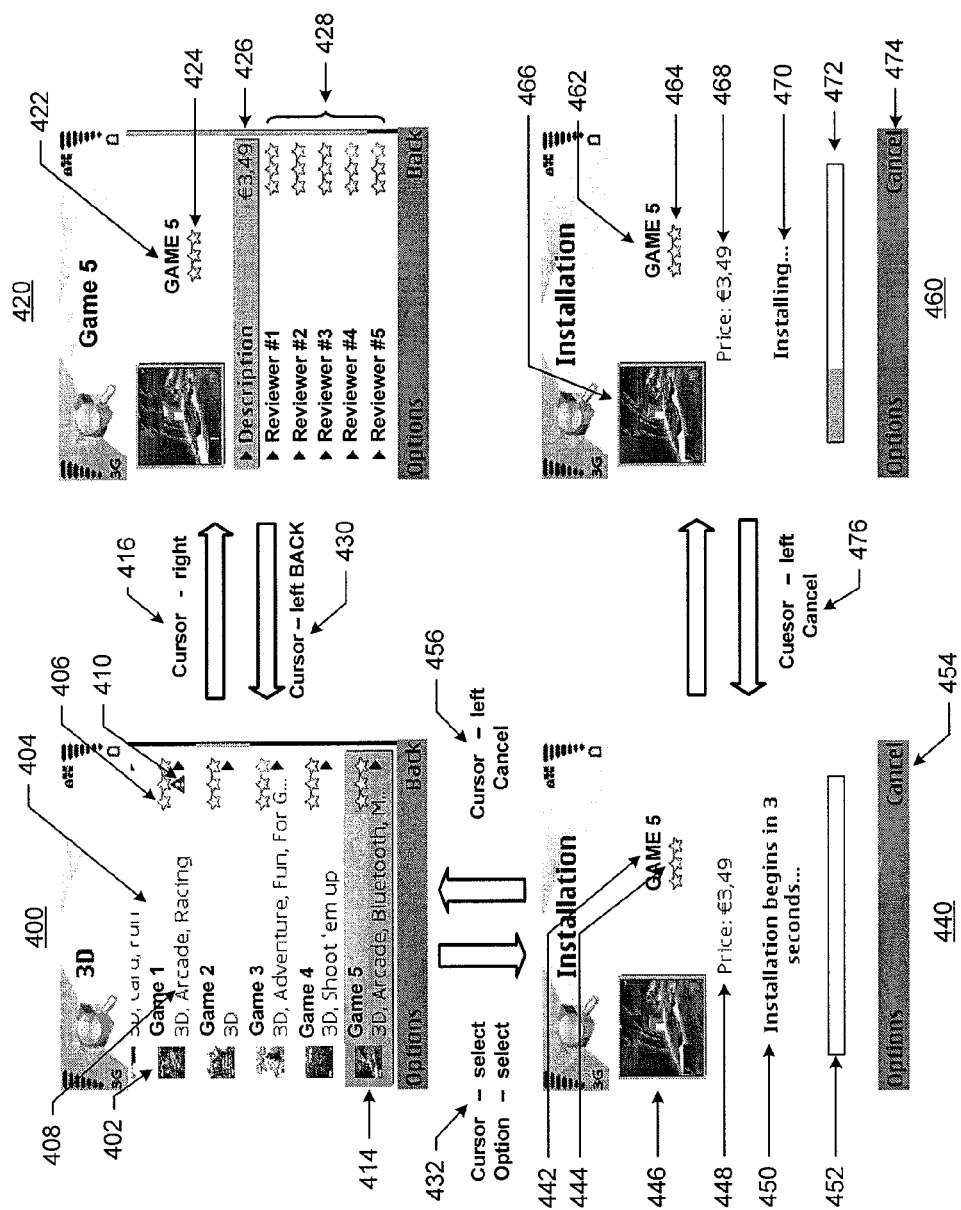
FIG. 4 is a pictorial flow diagram depicting a secure download or installation procedure according to an exemplary embodiment of the present invention.
Figure 5:
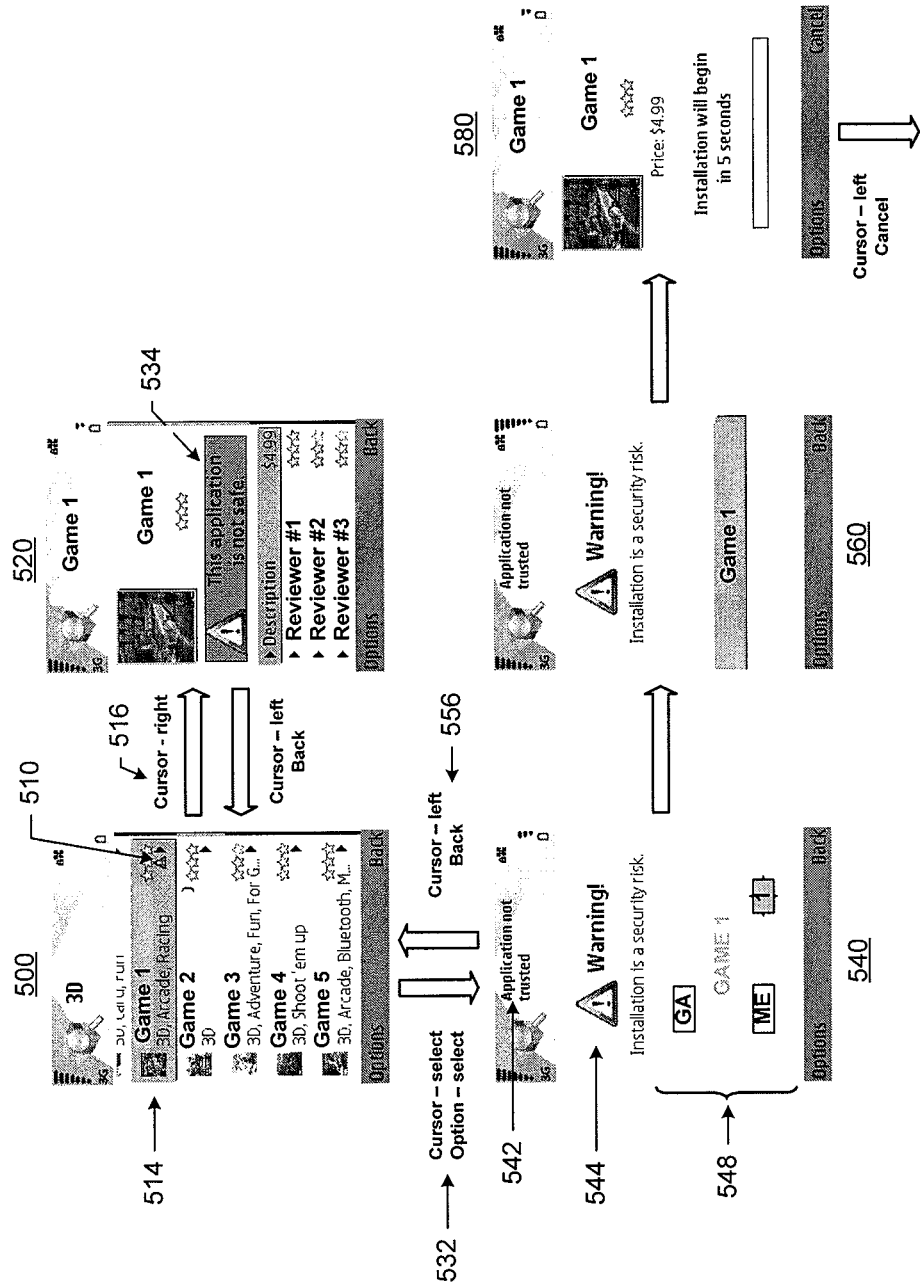
FIG. 5 is a pictorial flow diagram depicting a secure download or installation procedure according to an exemplary embodiment of the present invention.

FIGS. 3, 4, and 5 support a detailed description according to various embodiments of the invention. FIGS. 4 and 5 depict embodiments of the invention deployed on a mobile phone device. Again, the mobile phone of device of FIGS. 4 and 5 is used merely for illustration purposes and should not limit the invention to mobile phone device solutions.

In particular, FIG. 3 depicts a flow chart of the operations performed in accordance with an embodiment of the invention which can be implemented, for example, on a mobile terminal 10 of FIG. 1 or another electronic device. FIG. 3 generally describes a procedure for identifying a desired software, and then downloading or installing the desired software to a device. Briefly, the flow chart of FIG. 3 includes the operations of determining security attributes of a software at 300, and comparing security attributes with security preferences at 310. If the security attributes comply with the security preferences, then the procedure can proceed to download or install the software at 340. If the security attributes do not comply with the security preferences, the user can be notified of the noncompliance at 320 and the user can be required to perform a task at 350 before proceeding to software download and installation at 340. The following provides a more detailed description of the operations of FIG. 3.

According to various embodiments, prior to determining the security attributes of software at 300, a user may already know the location of desired software, or a user may need to locate the software. In some embodiments, a user can perform a search of a network, such as the Internet, using, for example, the wireless communications system of FIG. 2, to locate the software. In some embodiments, the software may already be stored on the device, and no download will be necessary, but a user may be inquired as to whether the user would like to check for updates to the previously downloaded software. In either event, when a user locates one or more software, the security attributes of the software can be determined at 300. As such, in some embodiments when the user performs a search, the security attributes of the located software can be gathered and returned in addition to the search results.

A security attribute can be any type of parameter associated with software security. For instance, a security attribute can be a parameter indicating a warning level, a risk level, or an inappropriate behavior level. A security attribute can also be a threat type parameter which can indicate that the software is, for example, adware, spyware, or a virus. In some instances a security attribute may be a software source parameter which indicates the source website or software house where the software was developed.

The security attributes for software can be populated using data from various sources, such as, but not limited to, formal sources, expert sources, community sources, personal sources, other sources, or combinations thereof. A formal source can be, for example, a signing authority, such as, Symbiansigned or Verisign. An expert source can be, for example, an internet security company, such as, F-Secure or Symantec. A community source can be, for example, a grass-root software security initiative, such as, stopbadware.org. A personal source can be, for example, a friend or a corporate security entity. Other sources can include entities that perform automatic data analysis.

At 310, the security attributes of a software can be compared to security preferences. Security preferences can be parameters that collectively indicate a user's disposition with respect to security. In some embodiments, the setting for security preferences can be user defined. As such, security preferences can be set to a particular value or threshold. Some security preferences may indicate which specific websites or software houses provide secure software or other security information. In this regard, if a software is not located on a particular website or was not developed by a particular software house, then the software is noncompliant with the preference. Other preferences, such as, for example, a warning level can have a threshold preference level. If a software's warning level security attribute exceeds the warning level threshold setting in a security preference, then the software can be deemed non-compliant. The security preferences can be stored on a device, such as, for example, mobile terminal 10 in a memory component, such as, for example, non-volatile memory 42.

Accordingly, the comparison of a software's security attributes to the security preferences at 310, can be performed to determine whether the software is compliant or noncompliant with the security preferences. The comparison can be performed on a processor, such as, for example, controller 20 of mobile terminal 10. In some embodiments, the comparison can occur prior to the user selecting the software for download. For instance, as a result of a user's search inquiry, or a user's navigation to the software's location, an indication of the software can be conveyed to a user, such as by displaying icons or displaying software titles. Prior to conveying the indication of the software to the user, a comparison of located software's security attributes and the security preferences can be performed. Since the comparison is performed prior to conveying the indication of the software to the user, the indication of the software can ultimately include, in some embodiments, an indication whether the software is compliant or noncompliant. An indication that the software is noncompliant can be accomplished in a compact way, such as displaying a warning icon with the indication of the software. In addition, prior to selecting the software for download or installation, a user, in some embodiments, can retrieve specific details of the security attributes of the software, or other attributes of the software.

If the comparison of the security attributes to the security preferences results in the software being deemed compliant, and the user selects the software for download or installation, then download or installation can begin at 340. In some embodiments, the process of downloading or installing the software can be uninterrupted by warnings or further inquiries of the user when a software selected for download is deemed compliant. In some embodiments, a confirmation inquiry can be implemented before download or install is commenced. However, if the comparison of the security attributes to the security preferences results in the software being deemed noncompliant, and the user selects the software for download or installation, then additional operations can occur before a user is permitted to download or install the software.

When noncompliant software is selected for download or installation, the user can be notified of the noncompliance at 320. A user can be notified through, for example, visible indications, audible indications, touch indications, smell indications, taste indications, temporal indications, thermal indications, equilibrium indications, or combinations thereof. In some embodiments, notifying indications can use a high degree of sensory salience. Visible indications having a high degree of salience can include, but are not limited to, colors, images, dynamic images, warning symbols, different pages, flashing lights, or flashing displays. Audible indications having a high degree of saliency can include, but are not limited to, differing voices, such as male and female voices, and sounds such as, loud or uncomfortably pitched sounds. Touch, or haptic, indications, can include, but are not limited to, vibrations, such as repetitive vibration events, and changes in an object's texture or shape. Smell indications having a high degree of salience can include, but are not limited to, differing scents. Taste indications having a high degree of salience can include, but are not limited to, differing tastes. Temporal indications having a high degree of salience can include allowing differing durations of time before a download or install to cancel the operation. Thermal indications having a high degree of salience can include a heating or cooling of the installing or downloading device. In some instances, more than one sensory indication can be utilized because affecting a user through two or more senses can prove more successful in making the user cognitively aware of a situation.

With respect to each of these indications, or combinations of these indications, in some embodiments, a user can set one or more notification modes, where particular indications and intensity of indications can be implemented when the target software has particular security attributes. As such, a device can react to the selection of high risk software using a first mode and lower risk software using a second mode. A particular notification mode can be implemented when a software is selected that has security attributes that fit the criteria of the mode. For example, a mode could be set such that when the target software exceeds a particular warning level and has a threat type of virus, load audible tones, repetitive vibration events, and dynamic images are implemented.

In some embodiments, a user can also be required to perform a task at 330 when noncompliant software is selected. Performing a task can be a process with an arbitrary starting condition. In some embodiments, performing a task can be a cognitive process with an arbitrary starting condition, which can be referred to as a cognitive task. A cognitive task can be a task that requires evaluation by a user before performing the task. In some instances, a cognitive task can include an automated attention process where, for example, all ongoing processes are stopped, and the processes can only continue when after a user has made a decision and an associated selection. In this regard, the automated attention process can include, for example, a voice or vibration alert. A cognitive task can also include a controlled process where a user can evaluate how to achieve an objective. In this regard, the controlled process can include conscious activity having a level complexity such that a user can perform an evaluation of the situation in order to complete the task, such as, for example, solving a puzzle.

Further, performance of a task can comprise selecting the task such that the task is variable from one installation of software to another installation of software. Additionally, a user can experience a level of complexity with respect to the task. In some embodiments the level of complexity can vary based upon the security attribute values associated with the selected software. In some embodiments, the task can be a puzzle that can change for each download or install procedure, such as a puzzle where blocks or other shapes must be rearranged into a particular order or arrangement, or other cognitive puzzle, such as solving a mathematics problem, or entering a requested phrase or sentence. As such, in some embodiments, the puzzle cannot be solved automatically by a machine because human cognitive analysis can be necessary. In some embodiments, the task can be an inquiry of a user, requiring a user to provide a predetermined response. For example, a user may be asked a question. The answer to the inquiry provided by the user can be compared to a predefined response to determine if a user completed the task. When a user properly completes the task, download or installation of the selected software can occur.

In some conventional solutions, the download and/or installation procedure may involve multiple, disjoint applications causing to procedure to navigate across various trust domains. Multiple trust domains can be generated when applications are used together in a procedure, but the applications do not share information, such as security information. As a result, the disjoint applications can broaden the procedure's exposure to security issues and redundancy in user prompts. Since applications in conventional solutions are often in different trust domains, each application is unaware of the authorization decisions made by the user in the context of other applications. Consequently, the user may be asked to make the apparently same decision repeatedly. A way to avoid multiple access control decisions, and associated redundant user prompts, can be to securely link applications such that all of the applications in a procedure belong to the same trust domain. A way to achieve this is to have a single client-side application to be in control of the entire download and/or installation procedure and orchestrate other applications as needed. Accordingly, a consistent trust domain can exist where a procedure comprising multiple applications is implemented, and where the applications of the procedure are securely linked. As such, security issues associated with various trust domains can be avoided and user prompts can be kept to a minimum. In some embodiments of the invention, a user can be in a consistent trust domain throughout the selection, download, and installation procedure, or some subset of that procedure.

Accordingly, in some embodiments, selection, download, and installation can be accomplished using the same client-side application, and as such, in the same trust domain. Additionally, in embodiments where the selected software is already stored on the device, a consistent trust domain can be present for the selection and installation portions, since a download may be unnecessary.

FIGS. 4 and 5 depict pictorial flow diagrams of secure download or installation procedures according to an exemplary embodiment of the present invention. The pictorial flow diagrams of FIGS. 4 and 5 are depicted as screen shots from a mobile terminal, such as mobile terminal 10. However, as stated earlier, it is contemplated that embodiments of the invention should not be limited to mobile environments and mobile devices. Further, the pictorial flow diagrams of FIGS. 4 and 5 are exemplary in that embodiments of the invention should not be limited to visual user interfaces, but any type of user interface, including, but not limited to, an audible user interface. In some embodiments, the software of the user interface can be implemented as a Java midlet. In addition to providing screen shots, FIGS. 4 and 5 depict exemplary actions, in the form of cursor movements, used to navigate through an exemplary user interface. The cursor movements of FIGS. 4 and 5 can be implemented in various ways, including, but not limited to, mechanical mechanisms, such as key depressions, roller movement or touch screen operations, or audible mechanisms, such as voice command recognition.

FIG. 4 depicts an exemplary procedure according to various embodiments of the invention where a compliant software is selected to be downloaded or installed using an exemplary user interface. The procedure of FIG. 4 involves four screen shots of the user interface: a search results screen 400, a software information screen 420, a pre-installation screen 440, and a installation screen 460.

At the search results screen 400 a user can locate target software for download or installation. Prior to displaying search results screen 400, in some embodiments, a user can perform a search of a network, such as the Internet, using, for example, the wireless communications system of FIG. 2, to locate software. Search results screen 400 can be the results of a prior search inquiry, where the results can include a listing of the softwares that met the criteria of the search. Each entry in the listing can include, an application logo 402, title 404, rating indicator 406, description 408, and a security indicator 410.

The application logo 402 can be a pictorial representation of the software. The title 404 can be a textual representation of the software. The rating indicator 406 can indicate, for example, an entertainment or usefulness rating which may be determined by compiling rating information from various sources, such as other users or software review websites. The security indicator 410 can be an indication, such as an icon, that indicates whether the software's security attributes are compliant with the device's security preferences. As such, in some embodiments, the security attributes of the search result software can also be gathered and returned as a result of performing the search. In some embodiments, as a user scrolls through a listing of software, the titles of the software, or other information relating to the software, including, but not limited to, security information, can be audibly spoken to a user. In some embodiments, differing voices can be used to indicate whether a cursor has been stopped on compliant software. In this regard, when a cursor is stopped on software, the software is not selected, but is merely highlighted for selection. However, the process of stopping on software can be an activity which can trigger an action. For example, when, after scrolling or otherwise, a cursor is stopped on compliant software, a female voice can speak. On the other hand, when, after scrolling or otherwise, a cursor is stopped on non-compliant software, a male voice can speak. In search result screen 400, the cursor has stopped on software 414, e.g. "Game 5," of the listing. Since in this example software 414 is compliant software, indicated by the absence of a security indicator, a female voice can be utilized to speak the title of the software.

In the exemplary user interface of FIG. 4, after scrolling to compliant software 414, a cursor right operation 416 can select software for purposes of requesting additional information and open the software information screen 420. Software information screen 420 can include a selected software title 422, a rating indicator 424, a description selection 424, and user reviews 428. The selected software title 422 can be the title 404 of the selected software. The rating indicator 424 can be the same rating indicator as rating indicator 406. Description selection 426 can include further information regarding the selected software, including, for example, the price. Description selection 426 can also be selected to reveal additional information relating to the selected software. The user reviews 428 can be selected to reveal information entered by other users relating to the selected software. A cursor left operation 430 or other predefined action can return a user to the search result screen 400 from software information screen 420.

From the search result screen 400, a user can select software for download or install and open a pre-installation screen 440 by performing a cursor select 432. The pre-installation screen 440 can include a selected software title 442, a rating indicator 444, an application logo 446, an information field 448, a status field 450, a status bar 452, and a cancel selection 454. The selected software title 442 can be can be the same title as the title 404 for the selected software. The rating indicator 444 can be the same rating indicator as rating indicator 406 for the selected software. The application logo 446 can be the same application logo as application logo 402 for the selected software. Information field 448 can include information about the selected software such as, for example, the price of the software. Status field 450 can provide information regarding the download or installation process, such as, for example, the time remaining before download or installation will begin. The status bar 452 can indicate on a relative basis how much of the download or installation procedure is complete. The cancel selection 454 can be selected to abort the download or installation procedure and return to the search results screen 400. From the pre-installation screen 440 a user can be returned to the search result screen 400 by selecting the cancel selection 454 or by implementing a cursor left operation at 456 or taking some other predefined action.

From the pre-installation screen 440, after a timer has elapsed, the installation screen 460 can be displayed and the download or installation of the selected software can begin. It should be noted that since the selected software 414 is compliant software, the exemplary procedure depicted in FIG. 4 does not notify the user of non-compliant software or require the user to perform a task prior to beginning download or installation. The installation screen 440 can include a selected software title 462, a rating indicator 464, an application logo 466, an information field 468, a status field 470, a status bar 472, and a cancel selection 474. The selected software title 462 can be can be the same title as the title 404 for the selected software. The rating indicator 464 can be the same rating indicator as rating indicator 406 for the selected software. The application logo 466 can be the same application logo as application logo 402 for the selected software. Information field 468 can include information about the selected software such as, for example, the price of the software. Status field 470 can provide information regarding the download or installation process, such as, for example, whether download or installation has begun. The status bar 472 can indicate on a relative basis how much of the download or installation procedure is complete. The cancel selection 474 can be selected to abort the download or installation procedure. From the installation screen 440 a user can be returned to the search result screen 400 by selecting the cancel selection 474 or by implementing a cursor left operation at 476 or taking some other predefined action.

FIG. 5 depicts an exemplary procedure according to various embodiments of the invention where noncompliant software is selected to be downloaded or installed using an exemplary user interface. The procedure of FIG. 5 involves five screen shots of the user interface: a search results screen 500, a software information screen 520, a task screen 540, a task complete screen 560 and an installation screen 580.

The search result screen 500 can be the same screen as search result screen 400 and can have the same elements. However, in search results screen 500, noncompliant software 514, e.g. "Game 1," is selected. The presence of a security indicator 510 with the listing of software 514 can indicate that software 514 is noncompliant. The security indicator 510 can be an indication, such as an icon, that indicates whether a software's security attributes are compliant with a device's security preferences. Additionally, as discussed with respect to FIG. 4, in some embodiments, when a cursor is stopped on non-compliant software, during a scrolling operation or otherwise, a male voice can speak, stating, for example, the title of the software or security alert information. In some embodiments, when a cursor is stopped on noncompliant software other operations can be implemented to notify a user.

From search results screen 500, a cursor right operation 516 or some other predetermined action can select software 514 for information and open software information screen 520. Software information screen 520 can be the same as software information screen 420, except that information screen 520 can include a security indicator 534 because noncompliant software has been selected for information. Security indicator 534 can be an indication, such as an icon and text, that can express whether a software's security attributes are compliant with a device's security preferences. In some embodiments, other notifying indicators can be implemented to notify a user that noncompliant software has been selected for information. A cursor left operation 530 can return a user to the search result screen 500.

From the search result screen 500, a user can select software for download or install and, when the selected software is noncompliant software, open a task screen 540 by performing a cursor select 432. The task screen 540 can include a screen title 542, a warning indicator 544, a task interface 546, and a cancel selection 548. The design of the task screen 540 can be different from the pre-installation screen 440, and thus indicate to a user that a noncompliant software has been selected for download. Additionally, upon opening the task screen 540, one or more sensory indicators can be implemented to further warn the user that noncompliant software has been selected for download or install. For example, a vibration alert and a flashing display warning can be implemented when the task screen 540 is opened. The screen title 542 can inform the user that the software selected for download is noncompliant. Similarly, the warning indicator 544 can include various means of notifying the user that the software selected for download or install is noncompliant. In some embodiments, the warning indicator 544 can be a displayed icon and associated text. The cancel selection 546 can be selected to abort the download or installation procedure and return to the search results screen 500. The task interface 548 can be the portion of screen devoted to requiring a user to perform a task in order to proceed to the download or installation process. In the exemplary task interface 548 of FIG. 5, the task is a block puzzle. The block puzzle requires a user to align the blocks in a particular order. Task complete screen 560 depicts the task screen 540 after a user has completed the task.

Upon completing the task, the pre-installation screen 580 can be opened. Pre-installation screen 580 can be the same as pre-installation screen 440. After a time has elapsed, the download or installation procedure can begin. In some embodiments a confirmation inquiry can be included before download or install commences.

According to one aspect of the present invention, the electronic device, such as mobile terminal 10, which implements embodiments of the present invention generally, operates under control of a computer program product. The computer program product for performing the methods of embodiments of the present invention includes a computer-readable storage medium and computer-readable program code portions, such as a series of computer instructions, embodied in the computer-readable storage medium.

In this regard, FIG. 3 is a flowchart of method, apparatus and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as controller 20, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining security attributes of software prior to installation of the software, wherein the security attributes indicate a risk level that the software is a security threat;
   comparing, by a processor, the security attributes to predetermined security preferences;
   causing a notification to be provided in an instance in which the security attributes are noncompliant with the security preferences; and
   requiring performance of a task by a user in an instance in which the security attributes are noncompliant with the security preferences prior to installation of the software, the task being a puzzle requiring a solution to the puzzle and the task being selected such that the task is variable from one installation of the software to another installation of the software, and wherein values of the security attributes determine a complexity of the task.

2. The method of claim 1 wherein the security preferences have predetermined threshold levels which are compared against security attribute levels.

3. The method of claim 1 wherein causing the notification to be provided comprises causing at least one of visible indications or audible indications to be implemented.

4. The method of claim 1 wherein causing the notification to be provided comprises causing at least one of touch indications, smell indications, temporal indications, thermal indications, or equilibrium indications to be implemented.

5. The method of claim 1 wherein causing a notification to be provided in an instance in which the security attributes are noncompliant with the security preferences comprises causing at least one notification mode to be implemented wherein a notification mode utilizes one or more sensory indications and is implemented based on the values of the security attributes.

6. The method of claim 1 further comprising:
   selecting the software prior to determining the security attributes;
   causing the software to be downloaded after requiring performance of the task; and
   causing the software to be installed after downloading the software.

7. The method of claim 6 wherein determining the security attributes, comparing the security attributes to the predetermined security preferences, causing the notification to be provided, requiring performance of the task, selecting the software, causing the software to be downloaded, and causing the software to be installed, occur within a common trust domain.

8. The method of claim 1 wherein the task is a random task.

9. The method of claim 1, requiring performance of the task includes requiring performance of the task, the task being the puzzle requiring the solution, wherein to solve the puzzle shapes are to be rearranged into a particular arrangement.

10. The method of claim 1 wherein the security attributes at least indicate that the software is one or more of adware, spyware, or a virus.

11. An apparatus comprising at least one processor and at least one memory including computer program code, the at least one memory and the computer program code configured to, with the at least one processor, direct the apparatus at least to:
   determine security attributes of a software prior to installation of the software, wherein the security attributes indicate a risk level that the software is a security threat;
   compare the security attributes to predetermined security preferences;
   cause a notification to be provided in an instance in which the security attributes are noncompliant with the security preferences; and
   require performance of a task by a user in an instance in which the security attributes are noncompliant with the security preferences prior to installation of the software, the task being a puzzle requiring a solution to the puzzle and the task being selected such that the task is variable from one installation of the software to another installation of the software, and wherein values of the security attributes determine a complexity of the task.

12. The apparatus of claim 11 wherein the security preferences have predetermined threshold levels which are compared against security attribute levels.

13. The apparatus of claim 11 wherein the apparatus is directed to cause the notification to be provided by causing at least one of visible indications or audible indications to be implemented.

14. The apparatus of claim 11 wherein the apparatus is directed to cause the notification to be provided by causing at least one of touch indications, smell indications, temporal indications, thermal indications, or equilibrium indications to be implemented.

15. The apparatus of claim 11 wherein the apparatus is directed to cause the notification to be provided by causing at least one notification mode to be implemented wherein a notification mode utilizes one or more sensory indications and is implemented based on the values of the security attributes.

16. The apparatus of claim 11 wherein the apparatus is further directed to:
   permit selection of the software prior to determining the security attributes;
   cause the software to be downloaded after requiring performance of the task; and
   cause the software to be installed after downloading the software.

17. The apparatus of claim 16 wherein the apparatus is directed determine the security attributes, compare the security attributes to the predetermined security preferences, cause the notification to be provided, require performance of the task, permit selection of the software, cause the software to be downloaded, and cause the software to be installed, within a common trust domain.

18. The apparatus of claim 11 wherein the task is a random task.

19. The apparatus of claim 11 wherein the security attributes at least indicate that the software is one or more of adware, spyware, or a virus.

20. A non-transitory computer-readable storage medium having computer-readable program code portions stored therein, the computer-readable program code portions comprising:
   a first executable portion configured to determine security attributes of a software prior to installation of the software, wherein the security attributes indicate a risk level that the software is a security threat;
   a second executable portion configured to compare the security attributes to predetermined security preferences;
   a third executable portion configured to cause a notification to be provided in an instance in which the security attributes are noncompliant with the security preferences; and a fourth executable portion configured to require performance of a task by a user in an instance in which the security attributes are noncompliant with the security preferences prior to installation of the software, the task being a puzzle requiring a solution to the puzzle and the task being selected such that the task is variable from one installation of the software to another installation of the software, and wherein values of the security attributes determine a complexity of the task.

21. The computer-readable storage medium of claim 20 wherein the third executable portion further causes at least one of touch indications, smell indications, temporal indications, thermal indications, or equilibrium indications to be implemented.

22. The computer-readable storage medium of claim 20 wherein the task comprises a puzzle and wherein the fourth executable portion is configured to require a solution to the puzzle to be provided.

23. The computer-readable storage medium of claim 20 wherein the security attributes at least indicate that the software is one or more of adware, spyware, or a virus.

* * * * *